United States Patent
Kim et al.

(10) Patent No.: US 12,182,320 B2
(45) Date of Patent: Dec. 31, 2024

(54) SYSTEMS AND METHODS FOR STREAMING-BASED OJBECT RECOGNITION

(71) Applicant: Meta Platforms Technologies, LLC, Menlo Park, CA (US)

(72) Inventors: Kyungho Kim, San Jose, CA (US); Yee Sin Chan, San Francisco, CA (US); Kyunghun Jung, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 226 days.

(21) Appl. No.: 17/718,958

(22) Filed: Apr. 12, 2022

(65) Prior Publication Data
US 2023/0324982 A1 Oct. 12, 2023

(51) Int. Cl.
*H04N 13/344* (2018.01)
*G01S 17/06* (2006.01)
*G06F 3/01* (2006.01)
*G06T 7/246* (2017.01)
*H04N 21/234* (2011.01)
*H04N 21/81* (2011.01)

(52) U.S. Cl.
CPC .............. *G06F 3/011* (2013.01); *G01S 17/06* (2013.01); *G06T 7/248* (2017.01); *H04N 13/344* (2018.05); *H04N 21/23418* (2013.01); *H04N 21/816* (2013.01)

(58) Field of Classification Search
CPC .......... G06F 3/011; G06F 16/70; G01S 17/06; G06T 7/248; H04N 13/344; H04N 21/23418; H04N 21/816
See application file for complete search history.

(56) References Cited

U.S. PATENT DOCUMENTS

| | | | |
|---|---|---|---|
| 2016/0217760 A1* | 7/2016 | Chu | ..................... H04N 13/161 |
| 2019/0228143 A1* | 7/2019 | Guyomarc'h | ...... G06Q 20/3276 |
| 2020/0134780 A1* | 4/2020 | Chapiro | ................. G06F 3/013 |
| 2021/0291653 A1* | 9/2021 | Higashiyama | ......... G02B 27/01 |
| 2022/0078396 A1* | 3/2022 | Gül | ........................ H04L 65/65 |

(Continued)

OTHER PUBLICATIONS

Huang S., et al., "A Smart-Decision System for Realtime Mobile AR Applications," 2019 IEEE Global Communications Conference (GLOBECOM), Dec. 9, 2019, 6 pages.

(Continued)

*Primary Examiner* — Jitesh Patel
(74) *Attorney, Agent, or Firm* — Foley & Lardner LLP

(57) ABSTRACT

Systems and methods for streaming-based object recognition may include a device which transmits, to a server, video data and first coordinates of a first viewport for the device at a first time instance. The video data may include one or more objects in the first viewport. The device may transmit second coordinates of a second viewport for the device at a second time instance. The device may receive, from the server, data corresponding to the one or more objects within the second viewpoint. The data may be received in a sequence according to coordinates of the one or more objects relative to the second viewport. The device may render the data relative to the one or more objects within a third viewport at a third time instance.

21 Claims, 13 Drawing Sheets

(56) References Cited

U.S. PATENT DOCUMENTS

2022/0090929 A1* 3/2022 Shihoya ............... G08G 1/0112

OTHER PUBLICATIONS

International Search Report and Written Opinion for International Application No. PCT/US2023/018200, mailed Jul. 12, 2023, 11 pages.
Jain P., et al., "Overlay Practical Mobile Augmented Reality," Proceedings of the 1st International Workshop on Extreme Heterogeneity Solutions, May 18, 2015, pp. 331-344.
Ran X., et al., "DeepDecision: A Mobile Deep Learning Framework for Edge Video Analytics," IEEE Infocom 2018-IEEE Conference on Computer Communications, Apr. 16, 2018, pp. 1421-1429.
Ran X., et al., "Delivering Deep Learning to Mobile Devices via Offloading", VR/AR Network 17: Proceedings of the Workshop on Virtual Reality and Augmented Reality Network, Aug. 11, 2017, pp. 42-47.

* cited by examiner

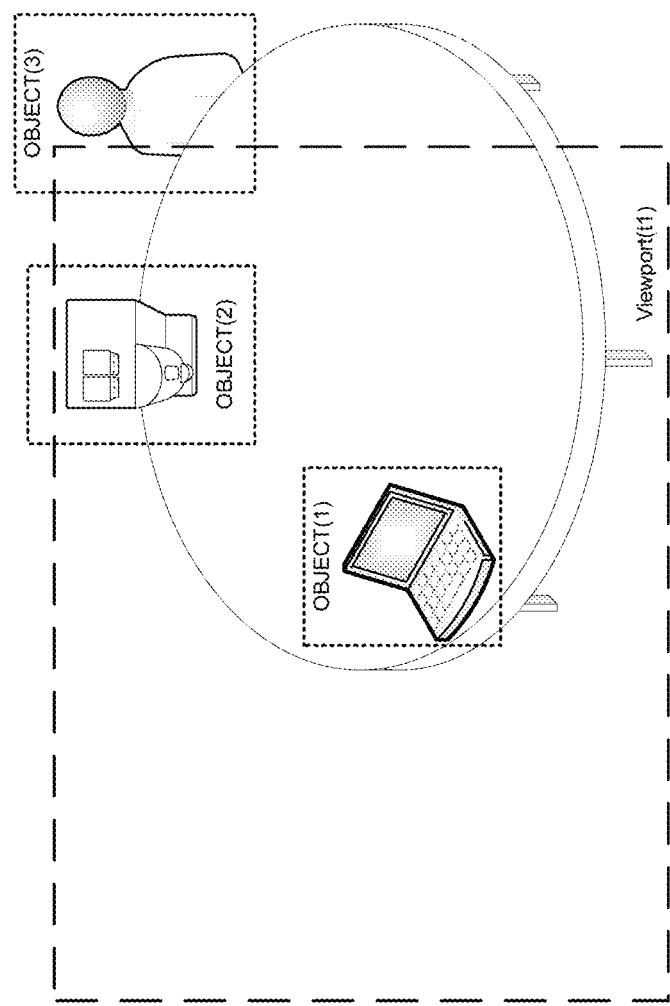

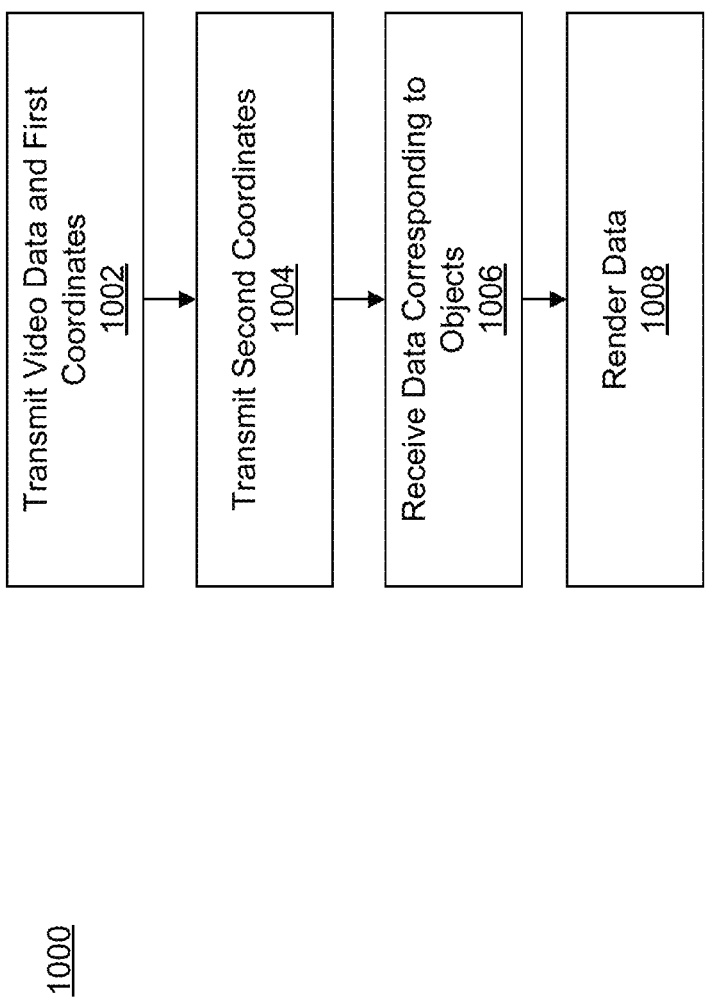

SYSTEMS AND METHODS FOR STREAMING-BASED OJBECT RECOGNITION

FIELD OF DISCLOSURE

The present disclosure is generally related to augmented reality (AR) and virtual reality (VR) devices, including but not limited to streaming-based object recognition for AR/VR devices.

BACKGROUND

Some devices may have augmented reality (AR) or virtual reality (VR) functionalities. For example, some devices may provide functions which allow a user or wearer of the device to interact in a virtual or augmented reality environment based on objects located and detected in a physical environment of the device.

SUMMARY

In one aspect, this disclosure is directed to a method. The method may include transmitting, by a device to a server, video data and first coordinates of a first viewport for the device at a first time instance, the video data including one or more objects in the first viewport. The method may include transmitting, by the device, second coordinates of a second viewport for the device at a second time instance. The method may include receiving, by the device from the server, data corresponding to the one or more objects within the second viewpoint. The data may be received in a sequence according to coordinates of the one or more objects relative to the second viewport. The method may include rendering, by the device, the data relative to the one or more objects within a third viewport at a third time instance.

In some embodiments, the method includes receiving, by the device, the data from the server in the sequence according to the coordinates of the one or more objects in relation to a reference point in the second viewport. In some embodiments, the one or more objects include a first object located at a first distance from the reference point and a second object located at a second distance from the reference point. The method may include receiving, by the device, the data for the first object from the server prior to the data for the second object, when the second distance is greater than the first distance. In some embodiments, the method includes determining, by the device, the first coordinates for the first viewport based on an orientation of the device using sensor data of the device.

In some embodiments, the method includes establishing, by the device with the server, one or more parameters for at least one of processing or transmitting the video data, and providing, by the device, the video data according to the established one or more parameters. In some embodiments, the method includes determining, by the device, whether available computational resources of the device satisfy a threshold criteria. In some embodiments, the method includes, at a fourth time instance, responsive to the available computational resources satisfying the threshold criteria, detecting, by the device, an object from second video data, determining, by the device, one or more features for the object, and transmitting, by the device, the object's coordinates and the one or more features to the server. In some embodiments, the one or more objects include at least one object located within the first viewport and outside the second viewport. The method may include determining, by the device, that the at least one object is within the third viewport, and rendering, by the device, the data relative to the at least one object within the third viewport. In some embodiments, the one or more objects include at least one object located within the second viewport. The method may include determining, by the device, that the at least one object is outside the third viewport, and forego rendering, by the device within the third viewport, the data corresponding to the at least one object.

In another aspect, this disclosure is directed to a device. The device may include a transceiver configured to transmit, to a server, video data and first coordinates of a first viewport for the device at a first time instance. The video data may include one or more objects in the first viewport. The transceiver may be configured to transmit, to the server, second coordinates of a second viewport for the device at a second time instance. The transceiver may be configured to receive, from the server, data corresponding to the one or more objects within the second viewpoint, the data received in a sequence according to coordinates of the one or more objects relative to the second viewport. The device may include at least one processor configured to render the data relative to the one or more objects within a third viewport at a third time instance.

In some embodiments, the transceiver is configured to receive the data from the server in the sequence according to the coordinates of the one or more objects in relation to a reference point in the second viewport. In some embodiments, the one or more objects include a first object located at a first distance from the reference point and a second object located at a second distance from the reference point. The transceiver may be configured to receive the data for the first object from the server prior to the data for the second object, when the second distance is greater than the first distance.

In some embodiments, the at least one processor is configured to determine the first coordinates for the first viewport based on an orientation of the device using sensor data of the device. In some embodiments, the at least one processor is configured to establish, with the server, one or more parameters for at least one of processing or transmitting the video data, and provide the video data according to the established one or more parameters. In some embodiments, the at least one processor is configured to determine, at a fourth time instance, whether available computational resources of the device satisfy a threshold criteria. In some embodiments, the at least one processor is configured to, responsive to the available computational resources satisfying the threshold criteria, detect an object from second video data, and determine one or more features for the object. The transceiver may be configured to transmit the object's coordinates and the one or more features to the server. In some embodiments, the one or more objects include at least one object located within the first viewport and outside the second viewport. The at least one processor may be configured to determine that the at least one object is within the third viewport, and can render the data relative to the at least one object within the third viewport. In some embodiments, the one or more objects include at least one object located within the second viewport. The at least one processor may be configured to determine that the at least one object is outside the third viewport, and can forego rendering of the data corresponding to the at least one object within the third viewport.

In another aspect, this disclosure is directed to non-transitory computer-readable medium storing instructions that, when executed by at least one processor, cause the at least one processor to transmit, via a transceiver to a server, video data and first coordinates of a first viewport for the device at a first time instance. The video data can include one or more objects in the first viewport. The instructions may cause the one or more processors to transmit, via the transceiver to the server, second coordinates of a second viewport for the device at a second time instance. The instructions may cause the one or more processors to receive, via the transceiver from the server, data corresponding to the one or more objects within the second viewpoint, the data received in a sequence according to coordinates of the one or more objects relative to the second viewport. The instructions may cause the one or more processors to render the data relative to the one or more objects within a third viewport at a third time instance.

In some embodiments, the instructions can cause the one or more processors to receive the data from the server in the sequence according to the coordinates of the one or more objects in relation to a reference point in the second viewport. In some embodiments, the one or more objects include a first object located at a first distance from the reference point and a second object located at a second distance from the reference point. The instructions may cause the one or more processors to receive the data for the first object from the server prior to the data for the second object, when the second distance is greater than the first distance.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 8A-FIG. 8D show a series of views of an environment of a device, according to an example implementation of the present disclosure.

FIG. 10 is a flowchart showing a method of streaming-based object recognition, according to an example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments below, the following descriptions of the sections of the specification and their respective contents may be helpful:

Section A discloses an artificial reality system which may be useful for practicing embodiments described herein;

Section B discloses a computing system which may be usable to implement aspects of the present disclosure; and Section C discloses systems and methods for streaming-based object recognition.

A. Artificial Reality System

Figure 1:
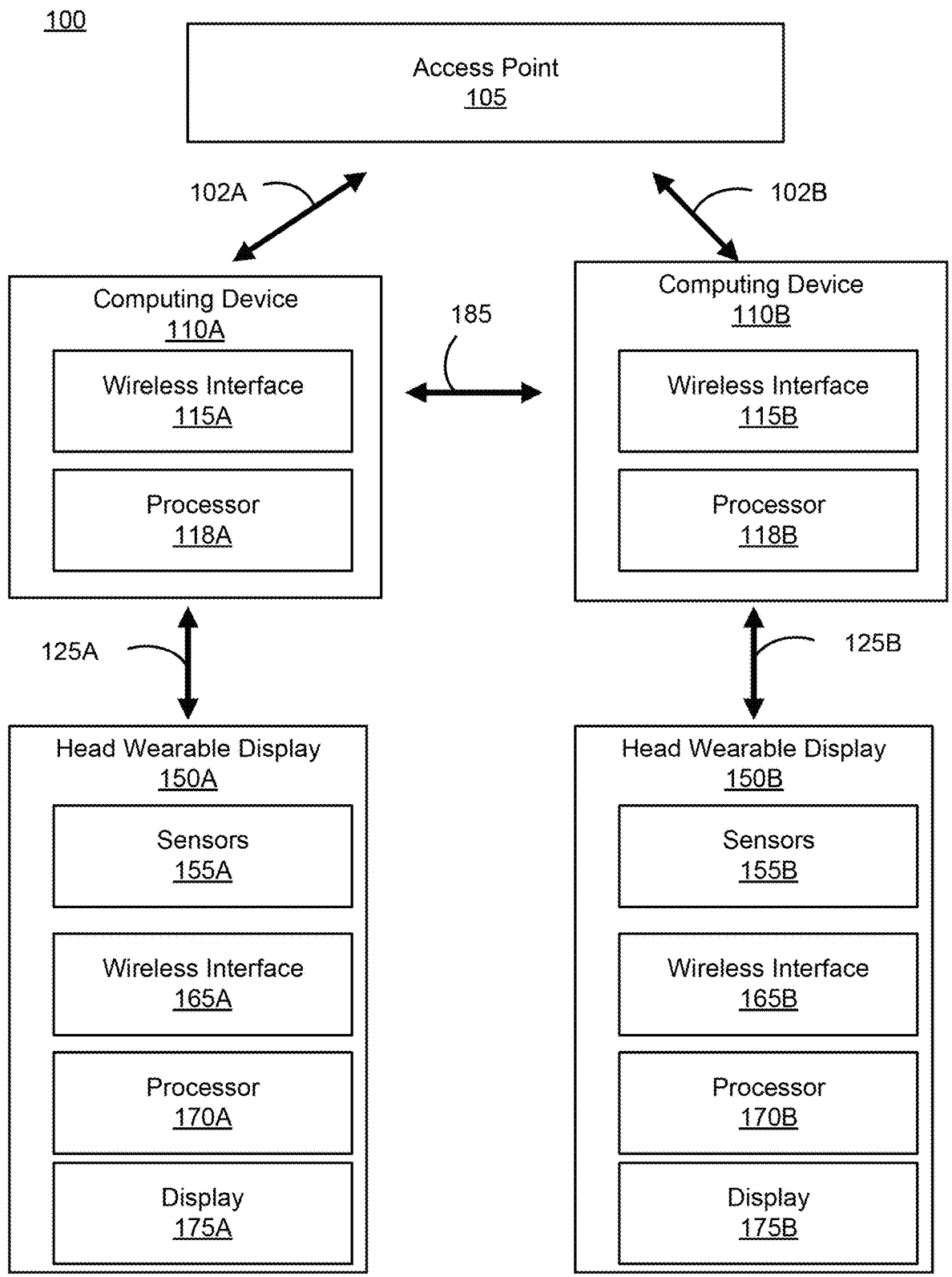
FIG. 1 is a diagram of a system environment including an artificial reality system, according to an example implementation of the present disclosure.

Disclosed herein are systems and methods for facilitating distribution of artificial reality (e.g., augmented reality (AR), virtual reality (VR), or mixed reality (MR)) content. FIG. 1 is a block diagram of an example artificial reality system environment 100. In some embodiments, the artificial reality system environment 100 includes a head wearable display (HWD) 150 worn by a user, and a console 110 providing content of artificial reality to the HWD 150. The HWD 150 may detect its location and/or orientation of the HWD 150, and provide the detected location/or orientation of the HWD 150 to the console 110. The console 110 may generate image data indicating an image of the artificial reality according to the detected location and/or orientation of the HWD 150 as well as a user input for the artificial reality, and transmit the image data to the HWD 150 for presentation.

In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150. For example, some of the functionality of the HWD 150 may be performed by the console 110. In some embodiments, the console 110 is integrated as part of the HWD 150.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a hand tracker 162, a communication interface 165, an image renderer 170, an electronic display 175, a lens 180, and a compensator 185. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detect a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming, for an example, that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming, for another example, that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110, or a combination of them, may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation, and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming, for an example, that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and an orientation of the hand. The hand tracker 162 may generate hand tracking measurements indicating the detected shape, location, and orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 165 may transmit to the console 110 data indicating the determined location, and/or orientation of the HWD 150, the determined gaze direction of the user, and/or hand tracking measurement. Moreover, through the communication link, the communication interface 165 may receive from the console 110 image data indicating or corresponding to an image to be rendered and additional data associated with the image.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, image data describing an image of artificial reality to be rendered and additional data associated with the image, and render the image through the electronic display 175. In some embodiments, the image data from the console 110 may be encoded, and the image renderer 170 may decode the image data to render the image. In some embodiments, the image renderer 170 receives, from the console 110 in additional data, object information indicating virtual objects in the artificial reality space, and depth information indicating depth (or distances from the HWD 150) of the virtual objects. In one aspect, according to the image of the artificial reality, object information, depth information from the console 110, and/or updated sensor measurements from the sensors 155, the image renderer 170 may perform shading, reprojection, and/or blending to update the image of the artificial reality to correspond to the updated location and/or orientation of the HWD 150. Assuming that a user rotated his head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality. In some embodiments, the image renderer 170 receives hand model data indicating a shape, a location, and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location, and an orientation of the HWD 150 in a physical space into a virtual space (or simultaneous localization and mapping (SLAM) data), motion vector information, depth information, edge information, object information, etc. The console 110 may provide the image data and the additional data to the HWD 150 for presentation of the artificial reality. In other embodiments, the console 110 includes more, fewer, or different components than shown in FIG. 1. In some embodiments, the console 110 is integrated as part of the HWD 150.

In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., wireless link). Through the communication link, the communication interface 115 may receive from the HWD 150 data indicating the determined location and/or orientation of the HWD 150, the determined gaze direction of the user, and the hand tracking measurement. Moreover, through the communication link, the communication interface 115 may transmit to the HWD 150 image data describing an image to be rendered and additional data associated with the image of the artificial reality.

The content provider 130 is a component that generates content to be rendered according to the location and/or orientation of the HWD 150. In some embodiments, the content provider 130 may incorporate the gaze direction of the user of the HWD 150, and a user interaction in the artificial reality based on hand tracking measurements to generate the content to be rendered. In one aspect, the content provider 130 determines a view of the artificial reality according to the location and/or orientation of the HWD 150. For example, the content provider 130 maps the location of the HWD 150 in a physical space to a location within an artificial reality space, and determines a view of the artificial reality space along a direction corresponding to the mapped orientation from the mapped location in the artificial reality space. The content provider 130 may generate image data describing an image of the determined view of the artificial reality space, and transmit the image data to the HWD 150 through the communication interface 115. The content provider 130 may also generate a hand model corresponding to a hand of a user of the HWD 150 according to the hand tracking measurement, and generate hand model data indicating a shape, a location, and an orientation of the hand model in the artificial reality space. In some embodiments, the content provider 130 may generate additional data including motion vector information, depth information, edge information, object information, hand model data, etc., associated with the image, and transmit the additional data together with the image data to the HWD 150 through the communication interface 115. The content provider 130 may encode the image data describing the image, and can transmit the encoded data to the HWD 150. In some embodiments, the content provider 130 generates and provides the image data to the HWD 150 periodically (e.g., every 11 ms).

Figure 2:
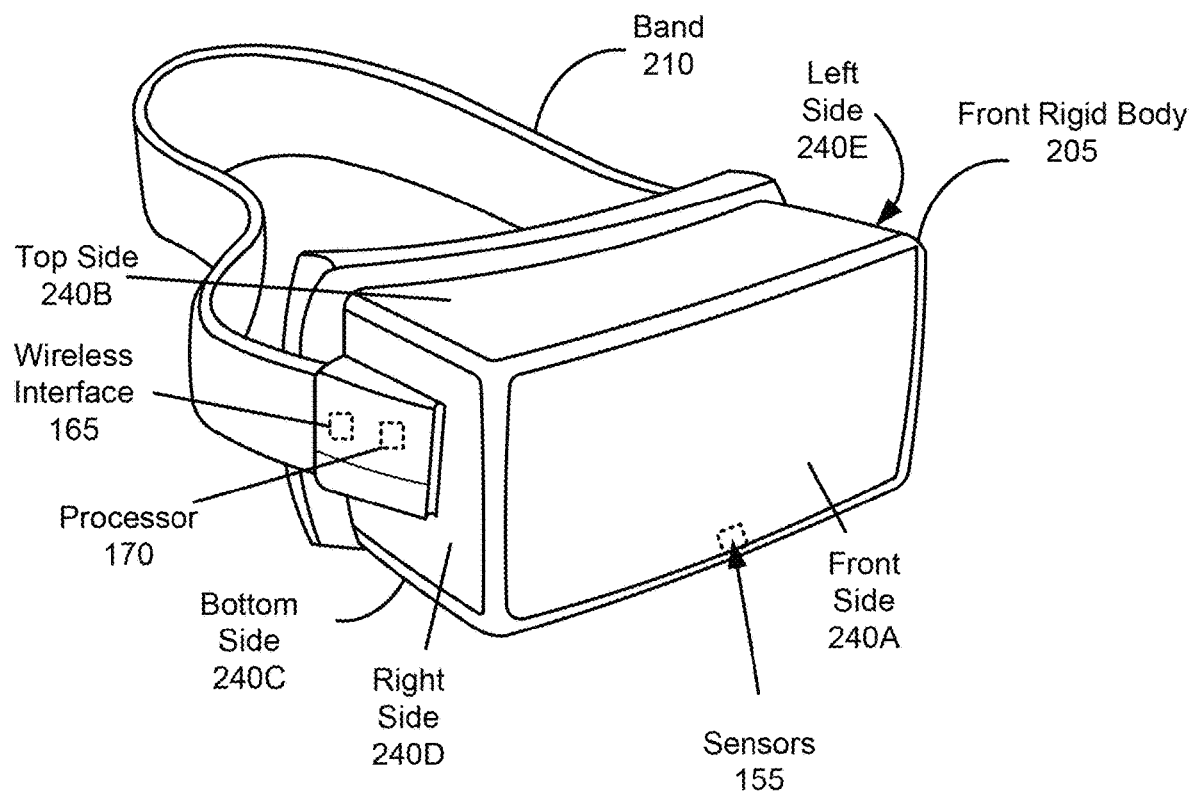
FIG. 2 is a diagram of a head mounted display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the communication interface 165, the image renderer 170, and the sensors 155 are located within the front rigid body 205, and may not visible to the user. In other embodiments, the HWD 150 has a different configuration than shown in FIG. 2. For example, the communication interface 165, the image renderer 170, the eye trackers 160A, 160B, and/or the sensors 155 may be in different locations than shown in FIG. 2. In some embodiments, the HWD 150 may include a plurality of communications interfaces 165. Similarly, the console 110 of FIG. 1 may include a plurality of communications interfaces 115. As described in greater detail below in section B, the communications interface(s) 115, 165 may be configured to selectively perform beamforming to optimize the communications channel between the console 110 and HWD 150. Similarly, the console 110 and HWD 150 may dynamically and intelligently switch between active and idle communications interface(s) 115, 165 to optimize the communications channel between the console 110 and HWD 150.

B. Computing System

Figure 3:
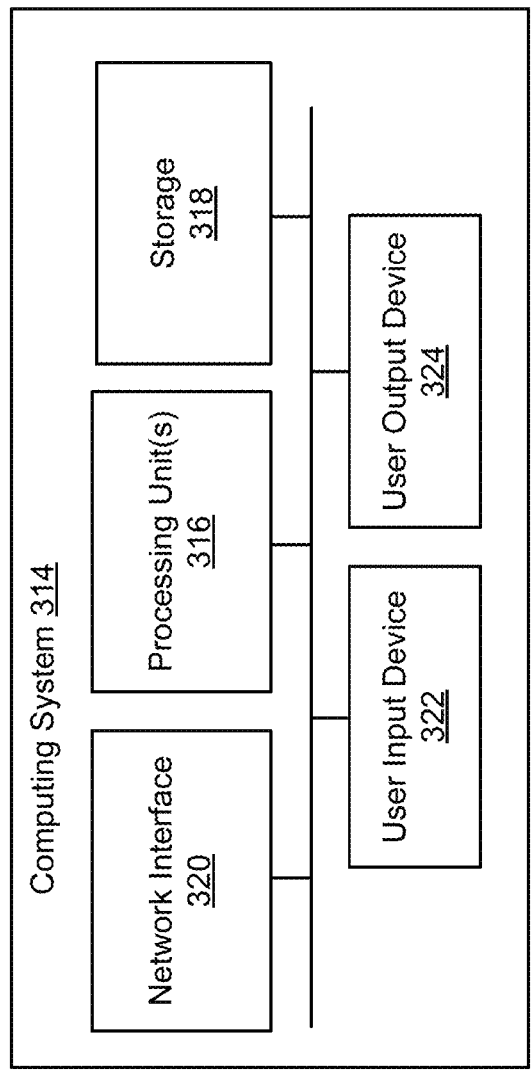
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 314 can be implemented to provide VR, AR, or MR experiences. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse, or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, (e.g., a liquid crystal display (LCD)), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations (e.g., by programming a processor or providing appropriate control circuitry) and various blocks might or might not be reconfigurable depending on how the initial configuration is obtained. Implementations of the present disclosure can be realized in a variety of apparatuses including electronic devices implemented using any combination of circuitry and software.

C. Systems and Methods for Streaming-Based Object Recognition

Figure 4:
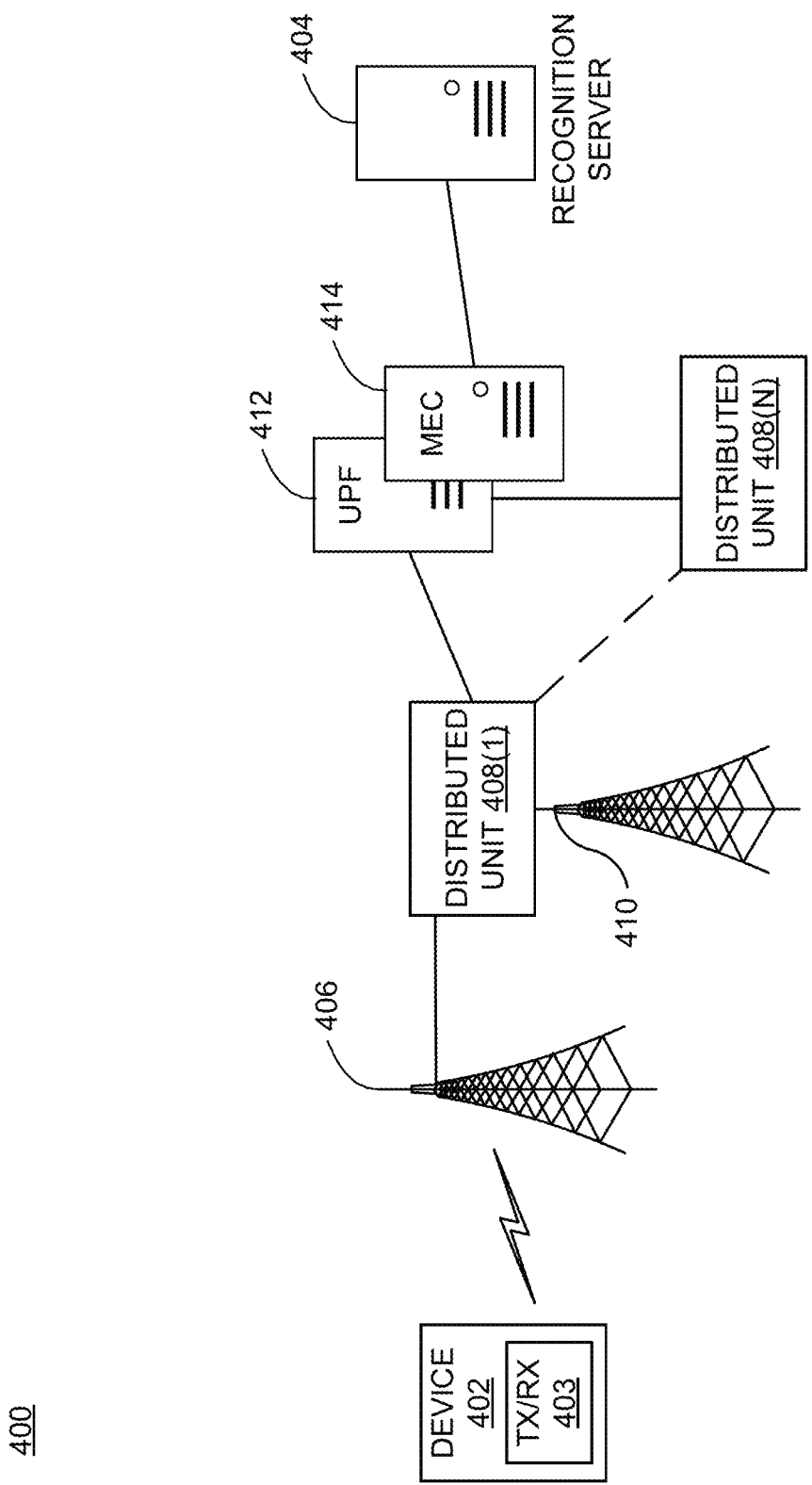
FIG. 4 is a network diagram showing a network path between a device and a recognition server, according to an example implementation of the present disclosure.

Referring now to FIG. 4, depicted is a network diagram 400 showing a network path between a device 402 and a recognition server 404, according to an example implementation of the present disclosure. Some devices (such as device 402) may operate in the augmented reality (AR)/virtual reality (VR) space. Such devices 402 may include a mobile device/smartphone, AR glasses, a VR headset, etc. The device 402 may be similar in some respects to or include components similar to the head wearable display 150/computing device 110, computing system 314, etc. described above with respect to FIG. 1-FIG. 3.

In some embodiments, a device 402 may be configured to provide AR/VR functionalities to a user. Some AR/VR devices 402 may be configured to provide a visual search function. The visual search function may involve a device 402 capturing images (or video) of an environment of the device 402 and detecting various objects in the environment. The device 402 may analyze the object (e.g., to extract, detect, or otherwise identify one or more features of the object). The device 402 may include a transceiver 403 configured to transmit (e.g., wirelessly) data to and/or receive data from one or more remote sources (such as the server 404). The transceiver 403 may be similar in some aspects to the wireless interface 115, 165 described above with reference to FIG. 1-FIG. 2 and/or network interface 320 described above with reference to FIG. 3. The device 402 may be configured to transmit (e.g., via the transceiver 403) object coordinates and the one or more features (e.g., as a feature vector or some other formatted/structured data which identifies the one or more features) to the recognition server 404. The recognition server 404 may analyze the object coordinates and feature(s) corresponding to the object, and can determine recognition results which the recognition server 404 transmits back to the device 402 for rendering at the device 402 (e.g., to a wearer/user of the device 402). The device 402 may therefore receive the recognition results (e.g., via the transceiver 403) from the recognition server 404. The recognition results may include, for instance, overlays provided (e.g., over/adjacent to/next to, etc.) near or relative to the object (e.g., within a viewport of a display for the device 402). The recognition results may include information related to the object (e.g., object name, object price, object location, where to purchase the object, etc.), potential actions for performing in relation to the object (e.g., place a call related to the object, order the object, etc.), and so forth.

In various embodiments, particularly where the device 402 operates in/over the cellular (e.g., 5G) space/network, the device 402 may transmit, send, or otherwise provide (e.g., via the transceiver 403) the information (e.g., object coordinates and feature(s)) to one or more cellular towers/radio head (RRH)/base stations 406 (e.g., a next generation node gNB for 5G). The base station 406 may forward, transmit, or otherwise provide the information to one or more digital or distributed units (DU) 408(1)-408(N) (which may be located at respective base stations 410 similar to base station 406. The digital unit 408 may transmit, send, forward, or otherwise provide the information to a user plane function (UPF) 412, which may in turn provide the information (e.g., either through a mobile edge computing (MEC) device 414 or unit or through some other internet-based channel or communication link) to the recognition server 404. The recognition server 404 may analyze the information, may determine/detect/generate/identify the recognition results, and can return the recognition results (e.g., via the same network path used to send the information to the recognition server 404 or via a different network path) for receipt (via the transceiver 403) by the device 402.

To facilitate determination of the recognition results by the recognition server 404, the device 402 may process various image(s) of objects in various aspects to identify various features which may be used to classify the objects in the image in various categories. Such categories may include, for instance, types of objects, land vs. water, plane vs. mountain, building vs. tree, etc. The device 402 may in some embodiments generate a feature vector which includes a series/collection/array/group of features generated for a set of categories. A data packet including a feature vector may have a smaller payload as compared to the image itself. However, as the number of categories considered by the device 402 increases in generating the feature vector, the payload correspondingly increases.

Due to limited processing capability of the device 402 (or corresponding tethered devices), it may be challenging for the device 402 to detect a large number of objects simultaneously, and even a limited number of objects where a user moves the device 402 rapidly (e.g., thereby changing the viewport for the device 402 rapidly). Additionally, due to the limited processing capability of the device 402 and limited storage, it may be challenging to expand the number of categories considered by the device 402 in determining features of objects. As such, a wearer/user of the device may not be able to locate a target object in the viewport (e.g., an object which the user desires to obtain information related to the object).

Figure 5:
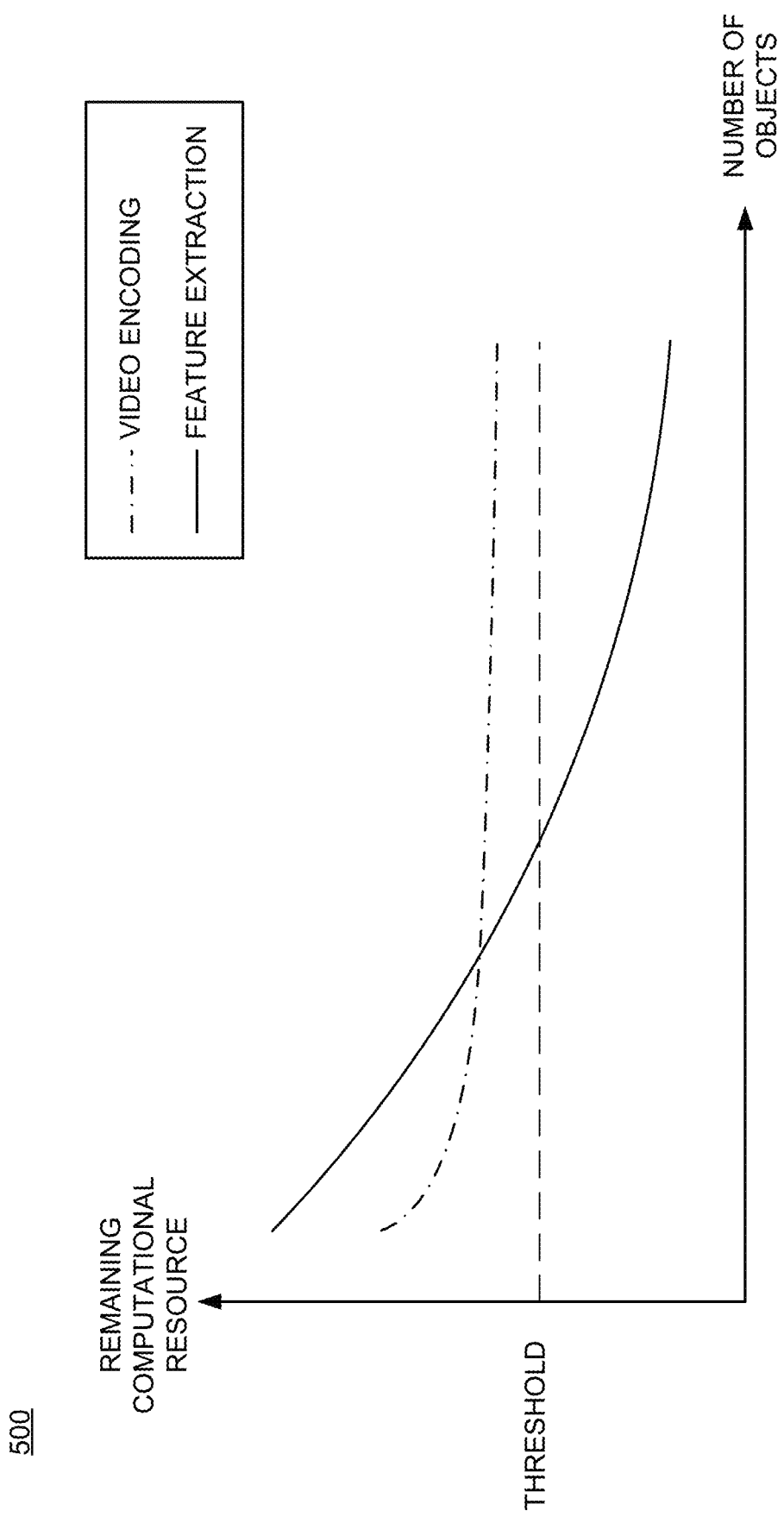
FIG. 5 is a graph showing remaining computational resources of a device in comparison to a number of objects in an environment of the device, according to an example implementation of the present disclosure.

Referring to FIG. 5, depicted is a graph showing remaining computational resources of a device 402 in comparison to a number of objects in an environment of the device 402, according to an example implementation of the present disclosure. As shown in FIG. 5, as the number of objects in the environment increases, the remaining computational resources correspondingly decreases (e.g., depending on the functions performed locally at the device 402 or by a tethered device). However, the remaining computational resources may decrease at different rates depending on the functions performed locally at the device 402. In FIG. 5, for a device 402 to extract or otherwise determine features related to an object, as the number of objects in the environment increase, the remaining computational resources reduce at an inversely proportional rate (e.g., relatively linear reduction). This is because, as the number of objects increase, the device 402 determines features for many objects and therefore uses/expends/consumes further and further computational resources to determine such features. On the other hand, for the device 402 to encode a video feed, the remaining computational resources of the device 402 reduces to a steady state (e.g., regardless of the number of objects in the environment). In other words, for the device 402 to encode video feed, the computational resources may be expended/used/consumed by the device 402 at the front end, but plateaus regardless of the number of objects in the environment of the device 402.

Figure 6:
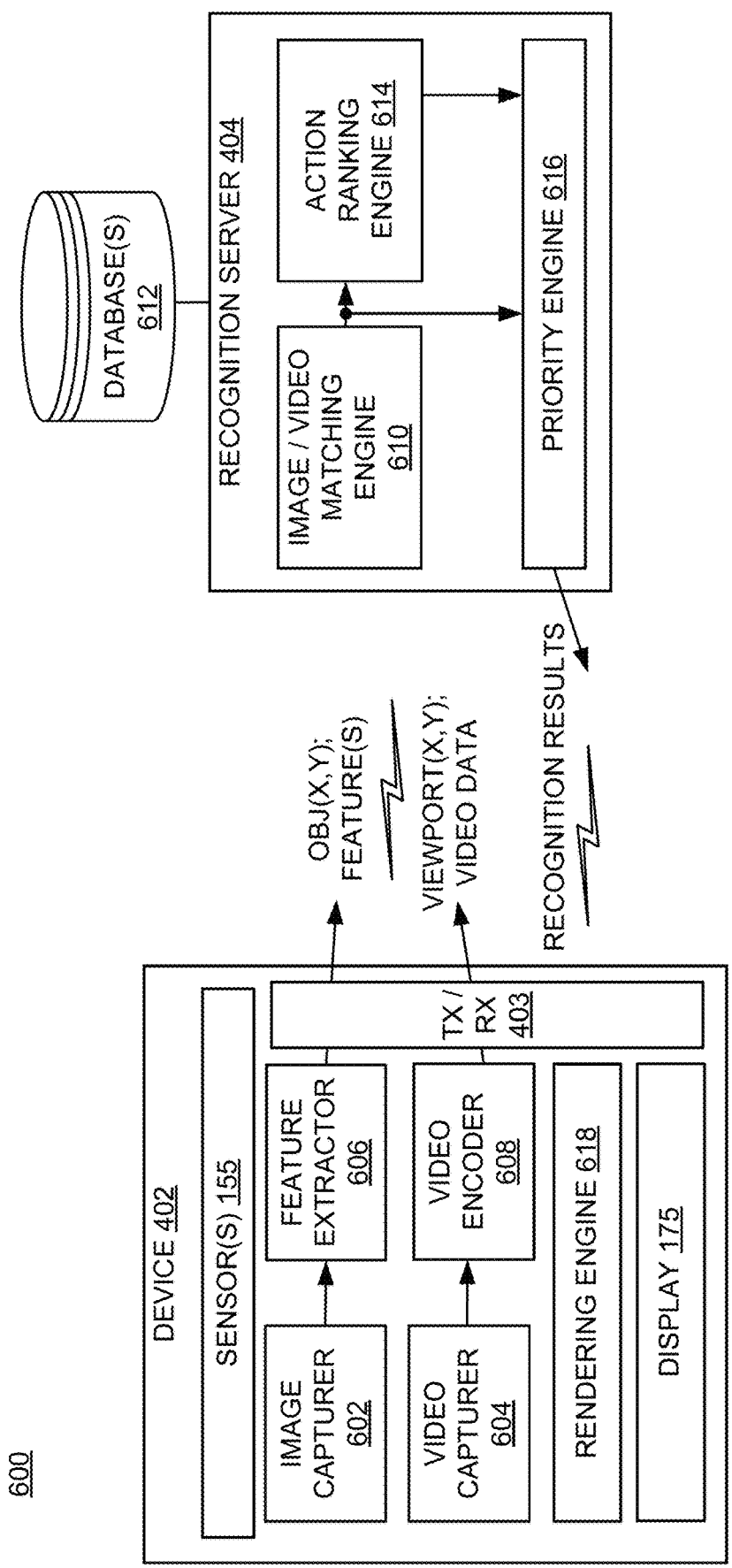
FIG. 6 is a block diagram of a system for streaming-based object recognition, according to an example implementation of the present disclosure.

Referring now to FIG. 6, depicted is a block diagram of a system 600 for streaming-based object recognition, according to an example implementation of the present disclosure. The system 600 may include one or more devices (e.g., the device 402) and one or more recognition servers (e.g., recognition server 404). As described above, the device 402 may be an AR/VR device, including a mobile device, smartphone, AR glasses, VR headset, etc.

The device 402 may include an image capturer 602 and a video capturer 604. The image capturer 602 may be or include any device, component, element, and/or hardware designed or configured to capture/acquire images of an environment (e.g., an external environment) of the device 402. The image capturer 602 may include, for instance, one or more cameras and hardware communicably coupled to the camera(s) which is configured to control or otherwise operate the camera(s) to capture various images of the environment. Similarly, the video capturer 604 may be or include any device, component, element, and/or hardware designed or configured to capture/acquire video of an environment (e.g., an external environment) of the device 402. The video capturer 604 may include, for instance, one or more cameras and hardware communicably coupled to the camera(s) which is configured to control or otherwise operate the camera(s) to capture video data (e.g., a live video feed) of the environment. In some embodiments, the image capturer 602 and video capturer 604 may use or include the same camera(s). In some embodiments, the image capturer 602 may be configured to capture images from the video data captured by or via the video capturer 604. In some embodiments, the image capturer 602 may be configured to capture images which are separate from the video data captured by or via the video capturer 604.

The device 402 may include a feature extractor 606. The feature extractor 606 may be or include any device, component, element, and/or hardware designed or configured to detect, sense, or otherwise identify one or more objects in the image(s) and/or video captured via the image capturer 602/video capturer 604. Where the feature extractor 606 first detects an object, the feature extractor 606 may be configured to detect, determine, or otherwise identify coordinates for the object within the image (or timestamp associated with a segment of the video data) in which the object was first detected. The coordinates may include, for example, coordinates of a bounding box assigned to (e.g., which bounds or surrounds) the object, a center of the bounding box, etc. As the object is detected in subsequent images/video data or where the device 402 is otherwise moved relative to the object, the feature extractor 606 may be configured to track a change in pose/position/orientation of the device 402 (e.g., using sensors 155 of the device 402) in relation to the coordinates of the object. In this regard, the feature extractor 606 may be configured to determine/monitor/track a location of the object as the device 402 moves about the environment (e.g., such that the position of the object in relation to the device 402 changes).

The feature extractor 606 may be configured extract, determine, recognize, or otherwise identify one or more features related to the object(s) in the environment. In some embodiments, the feature extractor 606 may be configured to maintain, include, or otherwise access various categories for different objects. The categories may correspond to different types of objects which may be located in a given environment. The feature extractor 606 may be configured to evaluate each of the detected objects against various categories to identify features which correspond to the objects. In some embodiments, the feature extractor 606 may be configured to identify features of an object as binary values (e.g., present or not present), a probability (e.g., percentage or other numerical representation of a likelihood of satisfying a particular category), etc. for the respective categories.

The device 402 may be configured to send, communicate, transmit, or otherwise provide (e.g., via the transceiver 403) object coordinates and the feature(s) corresponding to one or more objects to the recognition server 404. The device 402 may be configured to provide the object coordinates and feature(s) to the recognition server 404 as described above with reference to FIG. 4. The recognition server 404 may be configured to receive the object coordinates and feature(s) from the device 402. The recognition server 404 may include an image/video matching engine 610 (generally referred to as a "matching engine 610"). The matching engine 610 may be or include any device, component, element, and/or hardware designed or configured to determine that one or more feature(s) of the object (e.g., determined by the device 402) corresponds to, is related to, or otherwise matches features related to known object(s). For example, the matching engine 610 may be configured to use the feature(s) to perform a look-up in or otherwise to cross-reference data from one or more database(s) 612. The database(s) 612 may be configured to store, maintain, incorporate, or otherwise include data related to various objects and features corresponding to those objects. In some embodiments, the matching engine 610 may be configured to identify one or more candidate objects from the database(s) 612 based on features of the object received from the device 402 satisfying a matching criteria of feature(s) for the candidate objects in the database 612. The matching engine 610 may be configured to identify, select, detect, or otherwise determine a matched object from the candidate object(s) (e.g., based on the most or greatest number of matched features, a computed match score or probability, etc.).

The matching engine 610 may be configured to determine (e.g., generate/output) recognition results related to the object (e.g., using the matched object as a reference). For example, the matching engine 610 may be configured to determine recognition results by retrieving the recognition results from the database 612 which is associated with the matched object, by performing a query to another database or data store for information related to the matched object, etc. The recognition results may include data which corresponds to the object detected by the device 402. The recognition server 404 may be configured to communicate, transmit, send, or otherwise provide the recognition results to the device 402 for rendering to a user/wearer/viewer of the device 402 (e.g., by, using, via a rendering engine 618 of the device 402).

In some embodiments, the device 402 may be configured to determine whether the remaining computational resources of the device 402 satisfy one or more threshold criteria (e.g., are equal to and/or fall below a threshold, such as the threshold shown in FIG. 5). The device 402 may be configured to determine whether the remaining computational resources of the device 402 satisfy the threshold criteria as (e.g., while, simultaneously with, in parallel to) the device 402 extracts features of objects in the environment. As described in greater detail below, where the device 402 determines that the remaining computational resources satisfy the threshold criteria, the device 402 may be configured to communicate, transmit, send, or otherwise provide viewport coordinates and video data (e.g., a video feed, such as a live video feed, of the environment, encoded video data, etc.). The device 402 may be configured to transmit, send, or otherwise provide the encoded video data and viewport coordinates to the recognition server 404. In this regard, where the remaining computational resources satisfy the threshold criteria, the device 402 may be configured to offload feature extraction to the recognition server 402 by providing the encoded video data to the recognition server 404. Such implementations and embodiments may provide for better device 402 resource allocation and improved user experience, as well as better power conservation on the device 402.

Figure 7:
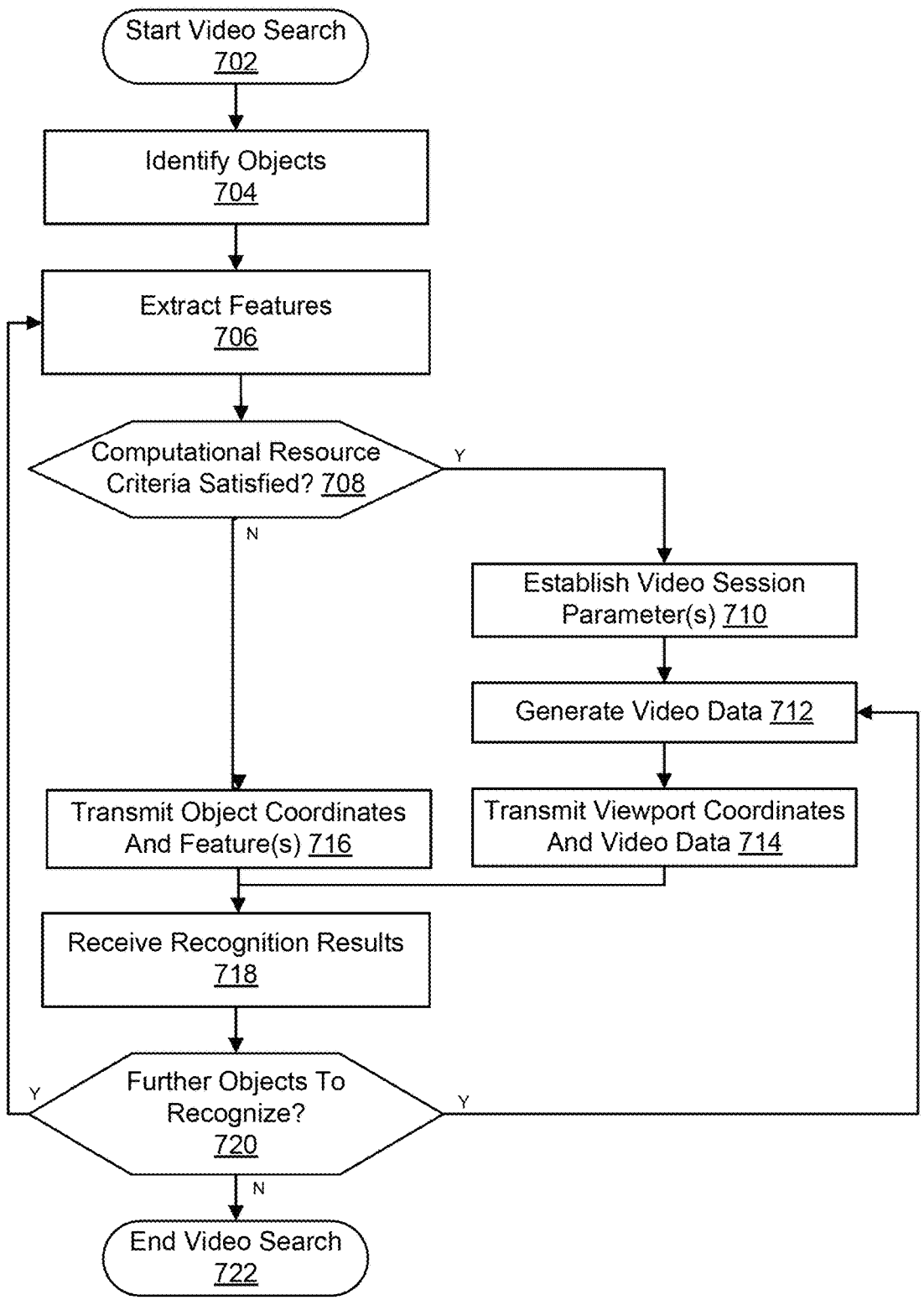
FIG. 7 is a flowchart showing a method of streaming-based object recognition, according to an example implementation of the present disclosure.

Referring now to FIG. 6 and FIG. 7, the device 400 may be configured to perform streaming-based object recognition. Specifically, FIG. 7 depicts is a flowchart showing a method 700 of streaming-based object recognition, according to an example implementation of the present disclosure. The method 700 may be performed by the device 402 described above with reference to FIG. 4 and FIG. 6.

The method 700 may begin at step 702, where the device 402 may start a video search. The video search may be or include an application, feature, or function provided by the device 402 to a user/wearer that recognizes objects in an environment of the device 402 and renders, displays, or otherwise provides information related to the recognized objects (e.g, via a display 175 of the device 402). The device 402 may start a video search responsive to a user/wearer of the device 402 launching a video search application or resource on the device 402 (or on a tethered/paired/communicably coupled device). The device 402 may be configured to start the video search by capturing video or image data of an environment of the device 402. The device 402 may be configured to capture the video or image data using the image and/or video capturer 602, 604 and one or more sensor(s) 155 of the device 402 (such as one or more cameras of the device 402). In some embodiments, the device 402 may be configured to capture images (e.g., via the image capturer 602) from a video feed or stream generated via the video capturer 604.

At step 704, the device 402 may be configured to identify various objects included in the image(s). The objects may be located in an environment of the device 402. As the device 402 moves about the environment, the device 402 may be configured to capture, generate, or otherwise obtain images of various objects located in the environment. The device 402 may be configured to obtain the images of objects which are located in a viewport of the device 402. The viewport, as described herein, may generally include a portion or region of the environment which is currently being viewed or displayed (e.g., on the display 175) of the device 402. As the device 402 moves about the environment (e.g., and the camera sensors 155 obtain images of the environment), the viewport may correspondingly change. As the viewport changes over time, different objects which are located in the environment may move into and out of the viewport over time.

The device 402 may be configured to detect or identify objects which are located within the viewport. In some embodiments, the feature extractor 606 may be configured to detect objects located in the viewport. The feature extractor 606 may be configured to use, leverage, or otherwise apply various neural network based or non-neural network based approaches for detecting or identifying objects within the environment. For example, the neural network based approaches may include, for instance, region proposals (such as regional-convolutional neural networks (R-CNN), fast R-CNN, Faster R-CNN, cascade R-CNN), single shot multibox detector, you only look once, single-shot refinement neural network for object detection including RefineDet, retina-net, deformable convolutional networks, and/or any other neural network based object detection system). Examples of non-neural network approaches may include, for instance, Viola-Jones object detection framework based on Haar features, a scale-invariant feature transform (SIFT), histogram of oriented gradient (HOG) features, or any other non-neural network based object detection system. As these services typically have latency constraints, one or a combination of these approaches may be used to return the results within a time limit, which may also be performed by taking the transport capability of networks connecting the device and server into account. The feature extractor 606 may be configured to apply one or more of the aforementioned object detection approaches to the images to identify or detect objects which are located in the viewport. Where the feature extractor 606 identifies/detects an object in the viewport (or otherwise identifies/detects an object which is located in one or more images obtained by the device 402), the feature extractor 606 may be configured to identify coordinates associated with the object. The coordinates may be or include relative coordinates of the object (e.g., in relation to a local coordinate system of the device 402).

At step 706, the device 402 may be configured to determine, detect, identify, or otherwise extract one or more features for objects detected in the environment of the device 402. In some embodiments, the feature extractor 606 may be configured to maintain various object classification models or classifiers associated with different object features. The feature extractor 606 may be configured to apply the object classification models or classifiers to one or more image(s) of a given object to extract features corresponding to the object. The feature extractor 606 may be configured to generate, detect, determine, or otherwise identify a feature set corresponding to the object. In some embodiments, the feature set may include a plurality of features which can be used to recognize the object. The feature set may be, for example, a feature vector. The feature extractor 606 may be configured to generate the feature set for a given object based on outputs/results from the classification model(s)/classifiers applied to the image of the object.

In some embodiments, the device 402 may be configured to extract features for each of the objects identified at step 704. The device 402 may be configured to extract the features as new objects are detected or identified in the environment. As such, and in some implementations, the device 402 may be configured to loop between steps 704 and 706.

The device 402 may be configured to determine, detect, or otherwise identify a computational resource condition of the device 402. The device 402 may be configured to identify the computational resource condition of the device 402 as the device 402 identifies objects at step 704 and extracts features of the objects at step 706. The device 402 may be configured to determine the computational resource condition as the remaining (available) computational resources. For example, the remaining computational resources may be or include a percentage utilization of a central processing unit (CPU) of the device 402, a remaining memory, a number of processes performable by the device 402, etc. The device 402 may be configured to compare the computational resource condition to a threshold. The threshold may be, for example, a threshold remaining computational resources (e.g., a threshold percentage utilization, a threshold remaining memory, a threshold number of processes performable by the device 402, etc.).

At step 708, the device 402 may be configured to determine whether the computational resource condition satisfies a threshold criteria based on the comparison. For example, where the computational resource condition is a percentage utilization, the computational resource condition may satisfy the threshold criteria responsive to the percentage utilization exceeding (or meeting) the threshold. As another example, where the computational resource condition is remaining memory, the computational resource condition may satisfy the threshold criteria responsive to the remaining memory meeting or falling below the threshold. As yet another example, where the computational resource condition is a number of processes performable by the device 402, the computational resource condition may satisfy the threshold criteria responsive to the number of processes performable meeting or falling below the threshold.

Where at step 708, (if/when) the device 402 determines that the computational resource criteria is not satisfied (e.g., the device has sufficient computational resources to perform object detection and feature extraction locally), the device 402 may be configured to (e.g., at step 716) transmit, send, communicate, or otherwise provide (e.g., via the transceiver 403) the object coordinates and identified features for the objects to the recognition server 604. The device 402 may be configured to provide, via the transceiver 403, the object coordinates and identified features (e.g., as a feature set, feature vector, etc.) to the recognition server 604 via the network path shown in FIG. 4. As described in greater detail below with respect to step 718, the recognition server 604 may be configured to recognize the objects (e.g., based on the features matching or substantially matching candidate objects from a database 612), and can transmit recognition results related to the matched object to the device 402.

Where at step 708, (if/when) the device 402 determines that the computational resource criteria is satisfied, the method 700 may proceed to step 710. At step 10, the device 402 may be configured to determine, negotiate, set, or otherwise establish one or more parameters for the transmission of video data to the recognition server 404. The parameters which may be selected, set, established, or otherwise determined for the session (e.g., by either the device 402 and/or recognition server 404) may include, for instance, a bit rate, a resolution, an encoding scheme, compression, and so forth. In some embodiments, the device 402 and recognition server 404 may be configured to establish the one or more parameters for a session between the device 402 and recognition server 404. The device 402 and recognition server 404 may be configured to negotiate the one or more parameters prior to establishing a session between the device 402 and server 404. For instance, and in some embodiments, the device 402 may be configured to transmit a session description protocol (SDP) packet or offer including one or more parameters selected by the device 402 for the session. The recognition server 404 may be configured to receive the SDP packet, identify the parameter(s) selected by the device 402, and generate an SDP response. The SDP response may include parameter(s) selected by the recognition server 404 based on the parameter(s) from the SDP packet. For example, where the recognition server 404 agrees with, consents to, or otherwise accepts one or more parameters from the SDP packet selected by the device 402, the recognition server 402 may generate an SDP response which includes those same one or more parameters. On the other hand, where the recognition server 404 identifies one or more parameters which are not deemed acceptable, the recognition server 404 may select different parameters. The device 402 and recognition server 404 may be configured to determine the parameter(s) for the video session based on the communications/packets/messages exchanged between the device 402 and recognition server 404.

At step 712, the device 402 may be configured to generate the video data. The video data may be or include a video stream, a video feed, etc. of the environment of the device 402. The video data may be or include live video data. The device 402 may be configured to generate the video data from, based on, or using data captured via the video capturer 604 using the camera sensor(s) 155 of the device 402. In some embodiments, the device 402 may be configured to generate the video data based on or according to the parameter(s) set/established/determined for the session. For example, where the parameters including a compression or encoding scheme, the device 402 may be configured to compress and/or encode the video data (e.g., using the video encoder 608) according to the negotiated/determined/set/ established parameters. Similarly, where the parameters include a resolution, the video encoder 608 may be configured to generate the video data at the established resolution parameter (e.g., by scaling up or scaling down the resolution according to the established resolution parameter). Additionally, where the parameters include a bit rate, the video encoder 608 may be configured to generate the video data for transmission, compression, encoding, etc. at the established bit rate.

The device 402 may be configured to determine, detect, or otherwise identify a viewport of the device 402. In some embodiments, the video capturer 604 may be configured to determine the viewport (e.g., boundary, scope and/or coordinates of the viewport). The device 402 may be configured to determine the viewport based on a current position, pose, location, or orientation of the device 402 with respect to the environment. In some embodiments, the viewport may be or include a portion or region of the environment which is currently being displayed (e.g., on the display 175) to the user. The device 402 may be configured to determine coordinates associated with or otherwise corresponding to the viewport. The device 402 may be configured to determine a location, position, pose, or orientation of the device 402 (e.g., the camera sensor 155) with respect to a coordinate system. The device 402 may be configured to determine the orientation of the device 402 using the camera sensor 155 and/or other various sensors of the device 402 (such as an inertial measurement unit (IMU), accelerometer(s), etc.).

In some embodiments, the device 402 may be configured to determine the coordinates in relation to a local coordinate system of the device 402. For example, the device 402 may be configured to define a local coordinate system for the device 402 where the device 402 is located at a center of the local coordinate system (e.g., [0, 0, 0]). The viewport may be defined as a region which corresponds to a direction in which a camera sensor 155 of the device 402 is facing (e.g., capturing images/video). For example, the direction of the camera sensor 155 (e.g., outward direction) may be defined as a vector which extends through a center of the viewport. The device 402 may be configured to determine the viewport coordinates based on the orientation of the device 402 and a fixed frame which corresponds to a size of the viewport. For example, where the device 402 determines the center of the viewport (e.g., based on the direction of the camera sensor 155) and a fixed frame that corresponds to the size of the viewport, the device 402 may be configured to determine the coordinates for the viewport using coordinates for the defined vector for the camera sensor 155 and the fixed frame size. As the device 402 moves about the environment, the device 402 may be configured to update, revise, modify, or otherwise determine new coordinates for the viewport.

At step 714, the device 402 may be configured to transmit, send, communicate, or otherwise provide (e.g., via the transceiver 403), the video data (e.g., generated at step 712) and viewport coordinates to the recognition server 404. In some embodiments, the device 402 may be configured to provide, via the transceiver 403, the video data and viewport coordinates via the network path described above with reference to FIG. 4. In some embodiments, the device 402 may be configured to stream (e.g., via the transceiver 403) the video data generated at step 712 to the recognition server 404. The device 402 may be configured to transmit the viewport coordinates at various time intervals/time instances as the device 402 determines that the viewport has changed (e.g., based on motion data of the device 402). In some embodiments, the device 402 may be configured to transmit the viewport coordinates at a first time instance, and transmit any determined updates to the viewport at different time instances (e.g., as a delta or change from the coordinates sent at the first time instance).

At step 718, the device 402 may be configured to receive (e.g., via the transceiver 403) recognition results from the recognition server 404. The determination and sending of the recognition results are discussed in greater detail with reference to FIG. 9. At step 720, the device 402 may be configured to determine whether there are any further objects in the environment to recognize. Where there are no further objects to recognize, the device 402 may end the video search (step 722). On the other hand, where there are further objects in the environment which have not been recognized, the method 700 may loop back to step 706 (e.g., where the computational resource criteria was not previously satisfied), or to step 712 (e.g., where the computational resource criteria was satisfied).

Figure 8B:
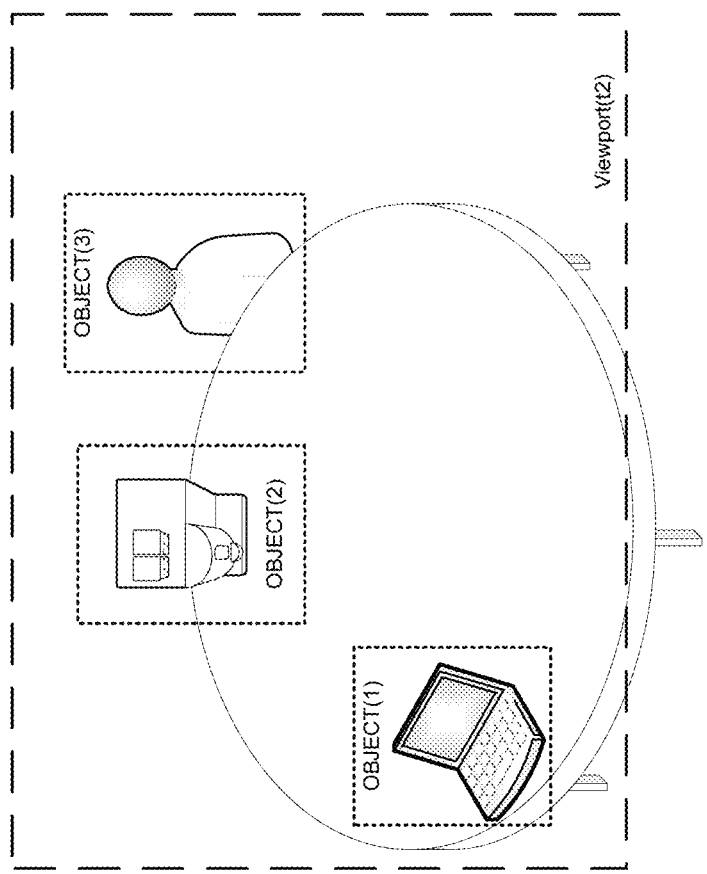

Referring now to FIG. 8A-FIG. 8D, depicted are a series of views of an environment 800 of the device 402, according to an example implementation of the present disclosure. As shown in FIG. 8A, the environment 800 may include various objects (e.g., object(1), object(2), object(3), etc.). The device 402 may be configured to capture (e.g., via the image capturer 602 and/or video capturer 604 using the camera sensor(s) 155) various representations (e.g., video feed, images, etc.) of the environment 800 including the objects. The device 402 may be configured to detect or identify the objects located in the environment 800, and can identify coordinates associated with the objects. For instance, the device 402 may be configured to identify coordinates associated with bounding boxes for the respective objects. In some instances (as described above with reference to steps 706 and 716), the device 402 may identify features of the object, and can transmit object coordinates and feature(s) to the recognition server 404. On the other hand, and as described above with reference to steps 710-714, the device 402 in some instances may establish video session parameters, encode video data, and transmit coordinates for the viewport to the recognition server 404.

As shown in FIG. 8A-FIG. 8D, the viewport may encompass, envelop, include, or otherwise device a portion or region of the environment 800 which is currently being displayed by the device 402 (e.g., on the display 175) to the user. The device 402 may determine the viewport coordinates based on a fixed frame size of the viewport and an orientation of the device 402 (e.g., using data from various sensor(s) 155 of the device). As shown in the progression between FIG. 8A-FIG. 8D, as an orientation of the device 402 changes over time, the viewport may correspondingly change over time.

At the first time instance (t1) shown in FIG. 8A, the device 402 may detect or identify the objects located in the environment 800. The device 402 may be configured to establish, detect, identify, or otherwise determine coordinates for each of the respective objects. The device 402 may be configured to establish bounding boxes for each object which surrounds, encompasses, or otherwise bounds the objects. The device 402 may be configured to transmit the video data and viewport coordinates to the recognition server 404, to receive information relating to the objects for rendering on the display 175 to the user/wearer of the device 402. In some instances, the device 402 may transmit the video data to the recognition server 402 in/on/as part of a session between the device 42 and recognition server 402. The recognition server 402 may be configured to extract or otherwise identify features of the objects located in the environment, and can provide information related to the objects back to the device 402 on the session. As described in greater detail below with reference to FIG. 9, and in some embodiments, the recognition server 402 may be configured to provide the information/data related to the objects in sequence based on coordinates of the objects in relation to the viewport. Such implementations may provide for prioritizing more pertinent object-related information which is to be sent to device 402 earlier, as described in greater detail below.

Figure 8C:
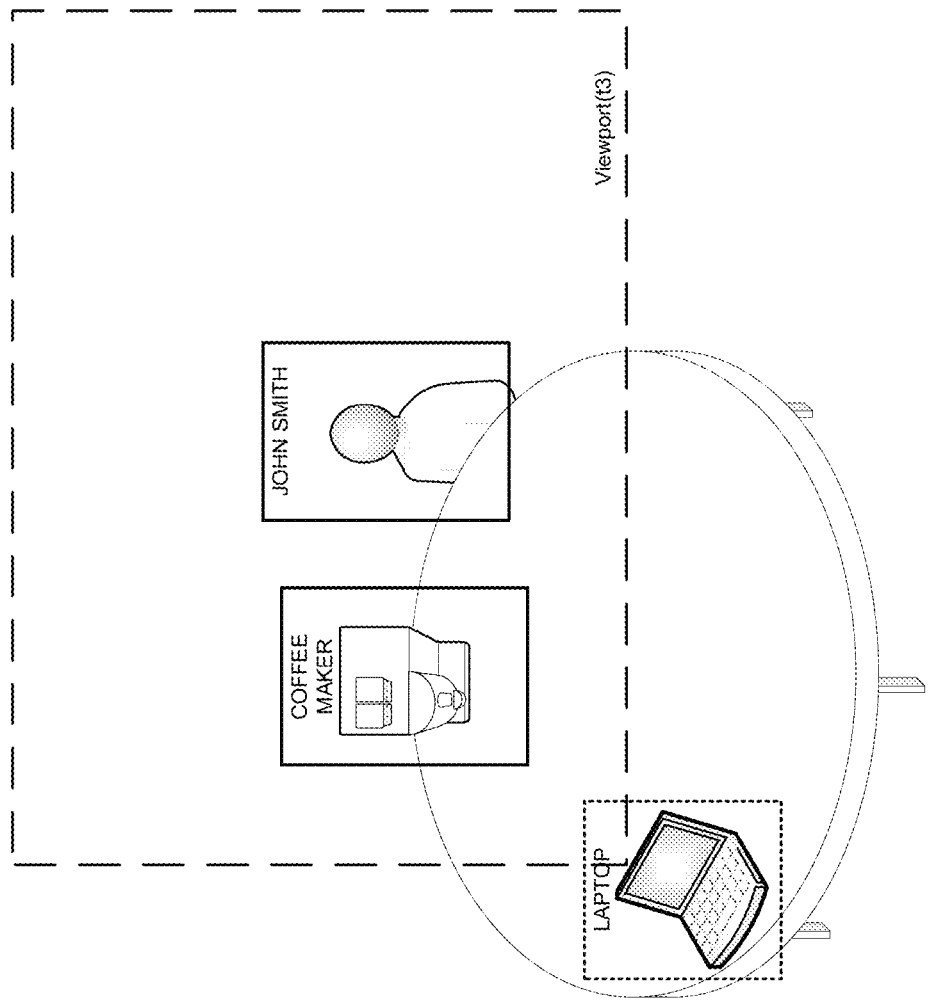
Figure 8D:
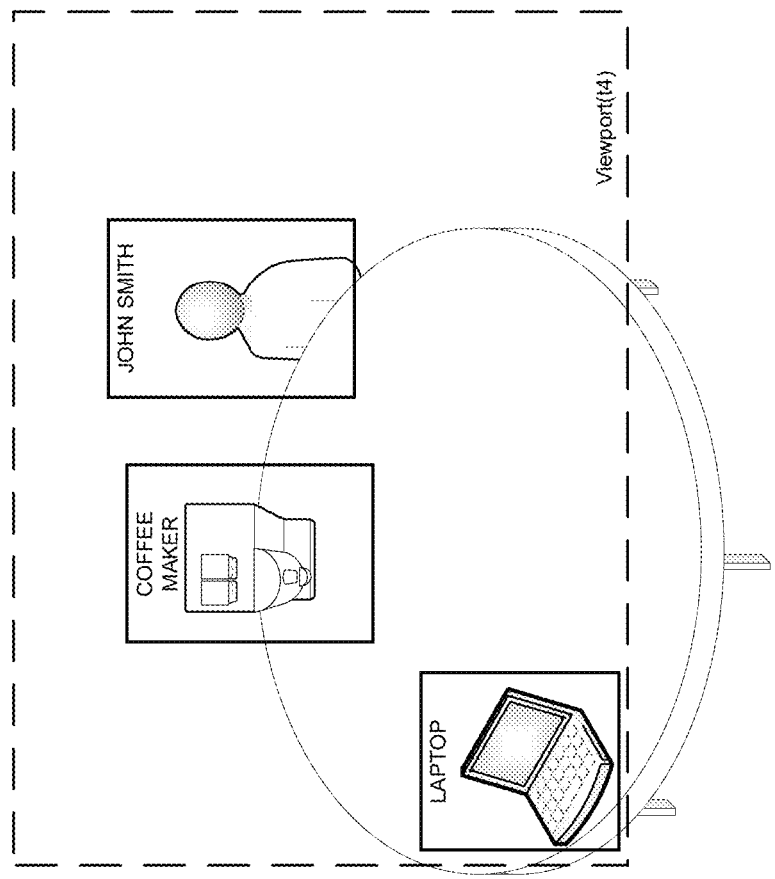
Figure 9:
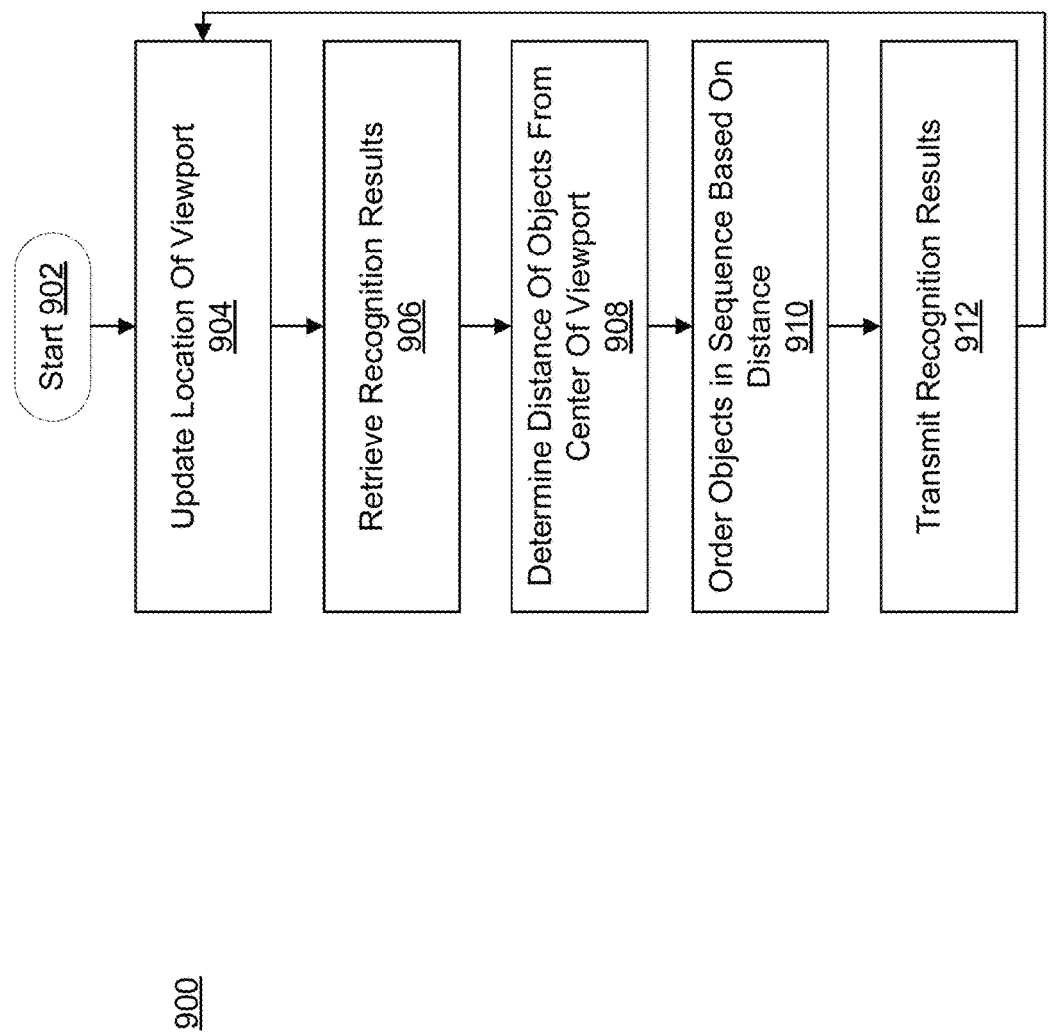
FIG. 9 is a flowchart showing a method of transmitting recognition results, according to an example implementation of the present disclosure.

Referring now to FIG. 9 with reference to FIG. 8A-8D, depicted is a flowchart showing a method 900 of transmitting recognition results, according to an example implementation of the present disclosure. The method 900 may be performed by the recognition server 404 using the data received from the device 402 (e.g., viewport coordinates, video data, etc.). As noted above, the recognition server 404 may be configured to receive various updates of the viewport coordinates from the device 402 at various intervals (e.g., at a fixed interval, responsive to the viewport changing, etc.). As a brief overview, the method 900 may begin at step 902. At step 904, the recognition server 404 may update a location of the viewport. At step 906, the recognition server 404 may retrieve/produce recognition results. At step 908, the recognition server 404 may determine distance(s) of object(s) from a center of the viewport. At step 910, the recognition server 404 may order objects (or recognition results of the objects) in sequence based on the distance(s). At step 912, the recognition server 904 transmits recognition results.

The method 900 may begin at step 902. In some embodiments, the method 900 may begin when the recognition server 404 receives first video data and viewport coordinates from the device 402. In some embodiments, the device 402 may send the first video data and viewport coordinates for/at a first time instance (t1) as shown in FIG. 8A. The video data may include representations of the objects (1)-(3) located in the environment 800 of the device. In some embodiments, the device 402 may send the first video data, viewport coordinates for the viewport at the first time instance, and object coordinates for the object(s) detected by the device 402 at the first time instance. In some embodiments, the device 402 may send the first video data and viewport coordinates at the first time instance, and the recognition server 404 may determine object coordinates for the objects represented in the video data at the first time instance.

At step 904, the recognition server 404 may update a location (e.g., orientation, scope, boundary) of the viewport. In some embodiments, the recognition server 404 may update the location of the viewport based on new/updated/second viewport coordinates received from the client (e.g., at a second time instance (t2)). As shown in FIG. 8B, the viewport may change between the first time instance and the second time instance (e.g., based on the user/wearer of the device 402 moving the device, or the scene/objects in the viewport changing/moving). The device 402 may transmit, send, communicate, or otherwise provide updated viewport coordinates for the second time instance to the recognition server 404. In some embodiments, the updated viewport coordinates may be a delta, shift, or change from the first viewport coordinates. The recognition server 404 may receive the change from the first viewport coordinates, and shift/modify/change/update the viewport coordinates based on the change received from the device 402. In some embodiments, the updated viewport coordinates may include a new set of coordinates for the second time instance which is different from the first set of coordinates received from the device 402. The recognition server 404 may update the viewport coordinates by replacing the first viewport coordinates with the second viewport coordinates.

At step 906, the recognition server 404 may retrieve (e.g., produce/provide/generate) recognition results. The recognition server 404 may retrieve recognition results for each of the objects included in the video data from the device 402. In some embodiments, the recognition server 404 may retrieve recognition results by detecting, determining, identifying, or otherwise extracting one or more feature(s) corresponding to a given object. In some embodiments, the matching engine 610 may parse/analyze/process image or video data which includes an object to identify feature(s) corresponding to the object. The matching engine 610 may identify the feature(s) in a manner similar to the feature extractor 606 described above with reference to FIG. 6. The matching engine 610 may identify a matched object which corresponds to the object in the image/video data using the feature(s) for the object and one or more databases 612. For example, the matching engine 610 may identify one or more candidate objects from the database(s) 612 which have feature(s) included in the database(s) 612 which match/substantially match/correspond to feature(s) for the object. The matching engine 610 may select or identify a matched object from the candidate object based on a matching score or selection criteria for matching the object in the image/video data to object(s) from the database(s) 612. For example, the matching score/selection criteria may include a weighted number of matched features, a threshold number of matched features, etc.

Once the recognition server 404 identifies a matched object from the database(s) 612, the matching engine 610 may determine, generate, or otherwise identify recognition results which correspond to the matched object. In some embodiments, the database(s) 612 may include recognition results which are linked to or otherwise associated with a data entry corresponding to the matched object. In some embodiments, the matching engine 610 may identify the recognition results by performing a look-up, search, or other query using an identifier or other data corresponding to the matched object to retrieve or receive the recognition results. The recognition results may include, for instance, information relating to the object (e.g., object name, phone number associated with the object, a location or address to purchase the object, etc.), actions which may be performed in relation to the object (e.g., call or send a message/email, order, etc.).

At step 908, the recognition server 404 may determine distance(s) of object(s) from a center of the viewport. Where multiple objects are located in the environment 800, the recognition server 404 may determine distances of each of the objects from the center of the viewport. In some embodiments, an action ranking engine 614 of the recognition server 404 may determine the distance(s) of the object(s) from the center of the viewport. The action ranking engine 614 may be or include any device, component, element, or other hardware configured or designed to rank objects based on actions of the wearer/user of the device 402. As shown in the progression between FIG. 8A-FIG. 8B, the wearer/user of the device 402 may move the device towards the third object. The action ranking engine 614 may determine the distance of each of the objects (e.g., coordinates associated with or corresponding to each of the objects) in the environment 600 from a reference point (such as the center or focal point) for the viewport. The action ranking engine 614 may determine the distance of each of the objects from a reference point using the latest (e.g., most recent) viewport coordinates (e.g., the coordinates used to update the viewport at step 904). In the example shown in FIG. 8A-FIG. 8D, assuming the recognition server 404 first received video data at the first time instance (t1) shown in FIG. 8A and subsequently receives updated viewport coordinates at the second time instance (t2) shown in FIG. 8B, the recognition server 404 may use the viewport coordinates for the second time instance (t2) to determine a distance of the objects from the reference point of the viewport.

At step 910, the recognition server 404 may order objects in sequence based on the distance(s). In some embodiments, the recognition server 404 may order the recognition results for respective objects in a sequence based on the determined distances of those objects from the reference point for the current viewport. In some embodiments, a priority engine 616 of the recognition server 404 may order the recognition results for the objects in the sequence. The priority engine 616 may be or include any device, component, element, or other hardware configured or designed to generate, establish, produce, organize, or otherwise provide the recognition results in an order or sequence for transmission or communication to the device 402. In some embodiments, the priority engine 616 may provide the recognition results in an order or sequence based on which objects are closest to the reference point for the viewport. For example, where the reference point is the center of the viewport, the priority engine 616 may provide the recognition results in an order or sequence based on which objects are closest to the center of the viewport. As shown in FIG. 8B, the second object may be closest to the center of the viewport, followed by the third object, with the first object being furthest from the center of the viewport. In this example, the priority engine 616 may provide the recognition results in the order or sequence of object(2), object(3), object(1).

At step 912, the recognition server 904 transmits recognition results. In some embodiments, the recognition server 904 may transmit the recognition results to the device 402. The recognition server 904 may transmit the recognition results to the device in the order or sequence determined at step 910. As such, the device 402 may receive the recognition results in an order or sequence based on the distances of the objects from the center (or other reference point) of the viewport. A rendering engine 618 of the device 402 may receive the recognition results from the recognition server 904 (e.g., in the order or sequence in which the recognition results were ordered at step 910). The rendering engine 618 may render or display (e.g., via the display 175) the recognition results to a user or wearer of the device 402. In some embodiments, the rendering engine 618 may render the recognition results of a subset of the objects based on those object(s) being located within the viewport. For example, and as shown in FIG. 8C, the rendering engine 618 may render the recognition results for the second and third objects (e.g., the coffee maker and John Smith), based on those objects being located within the viewport at the third time instance (t3). On the other hand, since the first object (e.g., the laptop) is not located within the viewport, the rendering engine 618 may forego/bypass/skip rendering of the recognition results. However, and as shown in FIG. 8D, when the first object moves to within the viewport (e.g., at the fourth time instance (t4)), the rendering engine may render the recognition results for the fourth object (e.g., the laptop).

The method 900 may loop back to step 904, as new video data is received from the device 402 and as the viewport for the device 402 changes (e.g., based on motion of the device 402). As such, the device 402 may stream video data and viewport coordinates to the recognition server 404, and the recognition server 404 may recognize objects in the video data and transmit data corresponding to the recognized objects back to the device 402 in an order, priority or sequence based on the location of the objects from a reference point of the most current (e.g., latest) viewport. Such implementations may provide for more pertinent/important/relevant information being received by the device earlier for display, which improves overall user experience and reduces perceived latency in a visual search deployment on the device.

Referring now to FIG. 10, depicted is a flowchart showing a method 1000 of streaming-based object recognition, according to an example implementation of the present disclosure. The method 1000 may be performed by the device 402 described above with reference to FIG. 4-FIG. 6. As a brief overview, at step 1002, the device transmits video data and first coordinates. At step 1004, the device transmits second coordinates. At step 1006, the device receives data corresponding to objects. At step 1008, the device renders the data.

At step 1002, the device transmits video data and first coordinates. In some embodiments, the device transmits the video data and the first coordinates to a server (such as the recognition server 402). The device may operate, use, or otherwise control a transceiver of the device to transmit the video data and first coordinates to the server. In some embodiments, the first coordinates may be coordinates for a first viewport for the device at a first time instance. The video data may include various objects which are located in the first viewport (e.g., represented in images/video rendered in the first viewport) at the first time instance. In some embodiments, the device may determine the first coordinates based on or according to sensor data of the device. The sensor data may be, for example, an inertial measurement unit (IMU) or accelerometer of the device. The sensor data may also include camera data from one or more cameras of the device. For example, the device may determine the first coordinates using a fixed frame size corresponding to a size of the viewport and a direction in which the device 402 is facing. The device may determine the direction in which the device is facing using the camera (e.g., a perspective of the camera), the IMU/accelerometer/etc.

In some embodiments, the device may establish one or more parameters for the processing or transmission of the video data to the server. The device may establish/configure/set the one or more parameters with the server. The parameter(s) may include, for instance, the transmission, encoding, compression, etc. of the video data. The device may negotiate with the server to establish the one or more parameters. For instance, the device may negotiate with the server by exchanging various session description protocol (SDP) packets or transmissions between the device and the server to set, determine, or otherwise establish the one or more parameters. The device may provide the video data according to the established one or more parameters. For example, the device may encode and/or compress the video data according to any encoding/compression parameters, the device may process (e.g., upscale or downscale) the video data according to any resolution parameters, the device may transmit the video data at a bit rate according to any bit rate parameters, etc.

At step 1004, the device transmits second coordinates. In some embodiments, the device may transmit second coordinates of a second viewport for the device at a second time instance. The device may transmit the second coordinates using the transceiver of the device. In some embodiments, the device may determine to transmit the second coordinates responsive to detecting movement or motion of the device (e.g., indicating a change of the viewport). In some embodiments, the device may determine to transmit the second coordinates responsive to a fixed interval. In other words, the device may transmit the second coordinates periodically, or on-demand responsive to a detected change in the viewport. The device may determine the coordinates for the second viewport based on motion data from various sensor(s) of the device, based on data from the camera(s) of the device, etc.

At step 1006, the device receives data corresponding to objects. In some embodiments, the device may receive data corresponding to the one or more objects within the second viewport. The device may receive the data using or via the device's transceiver (e.g., used to transmit the video data and viewport coordinates). The device may receive the data from the server (e.g., in which the device sent the viewport coordinates and video data). The data may be received in a sequence according to coordinates of the one or more objects relative to the second viewport. In some embodiments, and as described above with reference to FIG. 9, the recognition server may establish or generate the data corresponding to the objects in the sequence based on a location or coordinates of the objects relative to the second viewport (e.g., relative to a reference point of the second viewport, such as a center or center point of the second viewport). The device may receive the objects in the sequence set by or provided by the recognition server.

In some embodiments, two or more objects may be located within the viewport at the second time instance. For example, a first object may be located at a first distance from the reference point and a second object may be located at a second distance from the reference point (e.g., where the second distance is greater than the first distance). The recognition server may send data corresponding to the first object to the device prior to sending data corresponding to the second object. In some implementations, the recognition server may send the data corresponding to the first object prior to the data corresponding to the second object by sending a first packet for the first data of the first object and a second (subsequent) packet for the second data of the second object. In some implementations, the recognition server may send a single packet or stream, but the first data may be represented in the packet or stream prior to the second data. The device may receive the data for the first object from the server prior to the data for the second object.

At step 1008, the device renders data. In some embodiments, the device may render the data relative to the one or more objects within a third viewport at a third time instance. The device may render the data relative to the one or more objects by annotating/overlaying the data onto or proximate to the respective object(s). The device may render the data relative to the one or more objects by annotating a bounding box which surrounds or encompasses the respective object(s). The device may render the data relative to the one or more objects by annotating a portion or region which is spatially proximate to the respective object(s). The device may render the data on a display which is displaying the third viewport (including the corresponding object(s)) at the third time instance.

In some embodiments, as the device moves within the environment, objects may move into and out of the viewport. For example, an object which was present or located in the first viewport at the first time instance may not be present or located in the second viewport at the second time instance. The device may receive data corresponding to the object from the server (e.g., following, subsequent to, or after receiving any data for objects which were located in the second viewport). The device may determine that the object is located within the third viewport (e.g., the device moved such that the object is now located within the third viewport). The device may render the data relative to the object within the third viewport. Similarly, and as another example, an object which was present or located in the second (and even first) viewport may not be located in the third viewport. The device may determine that the object is located or positioned outside the viewport. The device may forego/bypass rendering the data corresponding to the object within the third viewport. However, if at a fourth time instance, the device determines that the object moved from outside the third viewport to being located in a fourth viewport, the device may render the data relative to the object in the fourth viewport.

In some embodiments, the device may determine whether available (e.g., remaining) computational resources of the device satisfy a threshold criteria. The device may determine whether available computational resources of the device satisfy the threshold criteria while the device detects objects within the viewport at various time instances and extracts features related to those objects. For example, and as described above with reference to FIG. 7, where the device (e.g., at a fourth time instance) determines that available computational resources of the device satisfy the threshold criteria (e.g., the available or remaining computational resources are greater than or equal to a threshold), the device may detect an object from the video data, determine (or detect, identify, or otherwise extract) features for the object, and transmit the object's coordinates and feature(s) to the server. However, where the device determine that the available computational resources of the device do not satisfy the threshold criteria, the device may transmit the video data and coordinates for the viewport to the server as described above with reference to step 1002. In this regard, the device may perform streaming-based object recognition by transmitting the video data and viewport coordinates to the server responsive to the available or remaining computational resources not satisfying a threshold criteria for feature extraction locally at the device (or by a tethered/paired device).

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate, or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general or special purpose computer or other machine with a processor. By way of example, such machine-readable media can comprise RAM, ROM, EPROM, EEPROM, or other optical disk storage, magnetic disk storage, or other magnetic storage devices, or any other medium which can be used to carry or store desired program code in the form of machine-executable instructions or data structures and which can be accessed by a general or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially," or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings, and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes, and omissions can also be made in the design, operating conditions, and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   transmitting, by a device to a server, video data and first coordinates of a first viewport for the device at a first time instance, the video data including one or more objects in the first viewport;
   transmitting, by the device, second coordinates of a second viewport for the device at a second time instance;
   receiving, by the device from the server, data corresponding to the one or more objects within the second viewport, the data received in a sequence according to coordinates of the one or more objects relative to the second viewport; and
   rendering, by the device, the data relative to the one or more objects within a third viewport at a third time instance.

2. The method of claim 1, comprising:
   receiving, by the device, the data from the server in the sequence according to the coordinates of the one or more objects in relation to a reference point in the second viewport.

3. The method of claim 2, wherein the one or more objects comprise a first object located at a first distance from the reference point and a second object located at a second distance from the reference point, the method comprising:
   receiving, by the device, the data for the first object from the server prior to the data for the second object, when the second distance is greater than the first distance.

4. The method of claim 1, comprising:
   determining, by the device, the first coordinates for the first viewport based on an orientation of the device using sensor data of the device.

5. The method of claim 1, further comprising:
   establishing, by the device with the server, one or more parameters for at least one of processing or transmitting the video data; and
   providing, by the device, the video data according to the established one or more parameters.

6. The method of claim 1, comprising:
   determining, by the device, whether available computational resources of the device satisfy a threshold criteria.

7. The method of claim 6, comprising, at a fourth time instance, responsive to the available computational resources satisfying the threshold criteria:
   detecting, by the device, an object from second video data;
   determining, by the device, one or more features for the object; and
   transmitting, by the device, the object's coordinates and the one or more features to the server.

8. The method of claim 1, wherein the one or more objects comprise at least one object located within the first viewport and outside the second viewport, the method comprising:
   determining, by the device, that the at least one object is within the third viewport; and
   rendering, by the device, the data relative to the at least one object within the third viewport.

9. The method of claim 1, wherein the one or more objects comprise at least one object located within the second viewport, the method comprising:
   determining, by the device, that the at least one object is outside the third viewport; and
   forego rendering, by the device within the third viewport, the data corresponding to the at least one object.

10. A device comprising:
    a transceiver configured to:
       transmit, to a server, video data and first coordinates of a first viewport for the device at a first time instance, the video data including one or more objects in the first viewport;
       transmit, to the server, second coordinates of a second viewport for the device at a second time instance;
       receive, from the server, data corresponding to the one or more objects within the second viewport, the data received in a sequence according to coordinates of the one or more objects relative to the second viewport; and
    at least one processor configured to render the data relative to the one or more objects within a third viewport at a third time instance.

11. The device of claim 10, wherein the transceiver is configured to:
    receive the data from the server in the sequence according to the coordinates of the one or more objects in relation to a reference point in the second viewport.

12. The device of claim 11, wherein the one or more objects comprise a first object located at a first distance from the reference point and a second object located at a second distance from the reference point, wherein the transceiver is configured to:

receive the data for the first object from the server prior to the data for the second object, when the second distance is greater than the first distance.

13. The device of claim 10, wherein the at least one processor is configured to:

determine the first coordinates for the first viewport based on an orientation of the device using sensor data of the device.

14. The device of claim 10, wherein the at least one processor is configured to:

establish, with the server, one or more parameters for at least one of processing or transmitting the video data; and provide the video data according to the established one or more parameters.

15. The device of claim 10, wherein the at least one processor is configured to:

determine, at a fourth time instance, whether available computational resources of the device satisfy a threshold criteria.

16. The device of claim 15, wherein the at least one processor is configured to:

responsive to the available computational resources satisfying the threshold criteria,
detect an object from second video data; and
determine one or more features for the object;
wherein the transceiver is configured to transmit the object's coordinates and the one or more features to the server.

17. The device of claim 10, wherein the one or more objects comprise at least one object located within the first viewport and outside the second viewport, wherein the at least one processor is configured to:

determine that the at least one object is within the third viewport; and
render the data relative to the at least one object within the third viewport.

18. The device of claim 10, wherein the one or more objects comprise at least one object located within the second viewport, wherein the at least one processor is configured to:

determine that the at least one object is outside the third viewport; and
forego rendering of the data corresponding to the at least one object within the third viewport.

19. A non-transitory computer-readable medium storing instructions that, when executed by at least one processor, cause the at least one processor to:

transmit, via a transceiver to a server, video data and first coordinates of a first viewport for the device at a first time instance, the video data including one or more objects in the first viewport;
transmit, via the transceiver to the server, second coordinates of a second viewport for the device at a second time instance;
receive, via the transceiver from the server, data corresponding to the one or more objects within the second viewport, the data received in a sequence according to coordinates of the one or more objects relative to the second viewport; and
render the data relative to the one or more objects within a third viewport at a third time instance.

20. The non-transitory computer-readable medium of claim 19, wherein the instructions further cause the one or more processors to:

receive the data from the server in the sequence according to the coordinates of the one or more objects in relation to a reference point in the second viewport.

21. The non-transitory computer-readable medium of claim 20, wherein the one or more objects comprise a first object located at a first distance from the reference point and a second object located at a second distance from the reference point, wherein the instructions further cause the one or more processors to:

receive the data for the first object from the server prior to the data for the second object, when the second distance is greater than the first distance.

* * * * *